JOHN W. HAINES.
Grinding Off the Shanks of Glass Knobs.
No. 125,565.            Patented April 9, 1872.
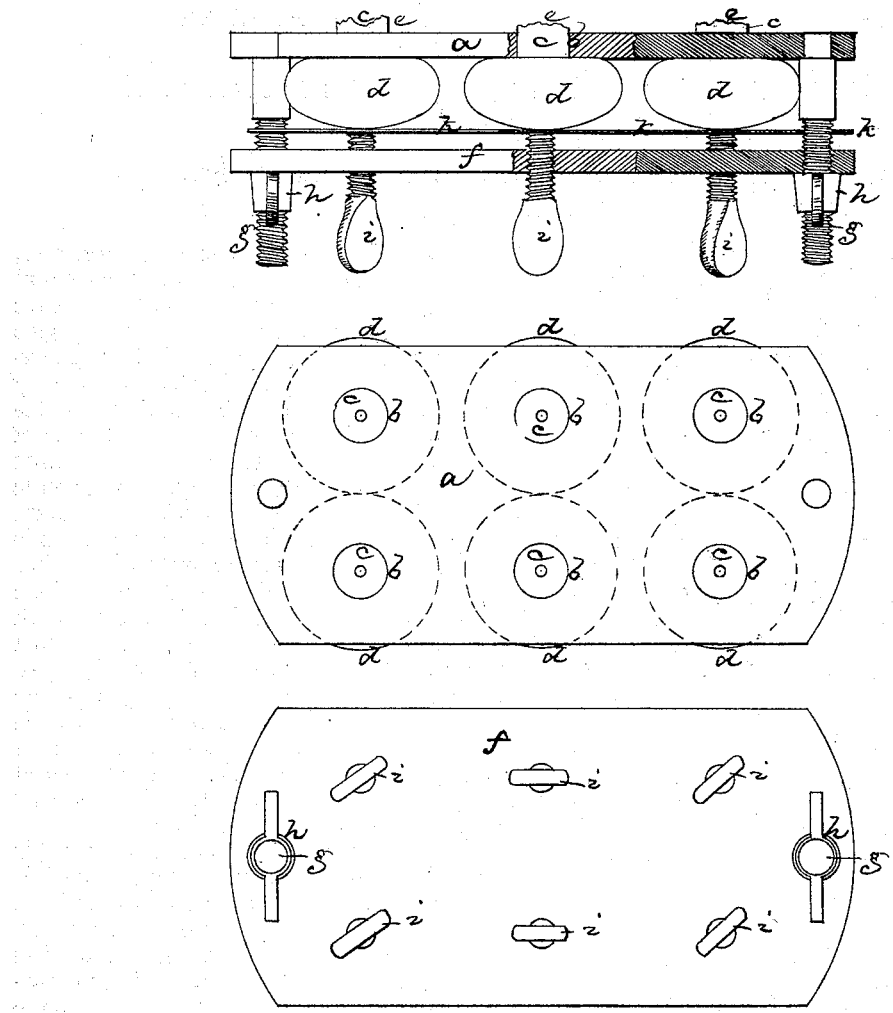

UNITED STATES PATENT OFFICE.

JOHN W. HAINES, OF CAMBRIDGE, ASSIGNOR TO HIMSELF AND UNION GLASS COMPANY, OF SOMERVILLE, MASSACHUSETTS.

IMPROVEMENT IN THE MODE OF GRINDING OFF THE SHANKS OF GLASS KNOBS.

Specification forming part of Letters Patent No. 125,565, dated April 9, 1872.

*To all whom it may concern:*

Be it known that I, JOHN W. HAINES, of Cambridge, in the county of Middlesex and State of Massachusetts, have invented an Improvement in Grinding Off the Shanks of Glass Knobs, &c.; and I do hereby declare that the following, taken in connection with the drawing which accompanies and forms part of this specification, is a description of my invention sufficient to enable those skilled in the art to practice it.

In grinding off the ends of the shanks or pins of glass knobs it is customary to hold the end of the peg to the periphery of a grinding-wheel by grasping the handle in the hand and presenting the end to the wheel. This operation is slow and tedious, and does not result in grinding the pegs to uniform length, or in square-facing the ends very perfectly. My invention is designed not only to effect the grinding more expeditiously and more perfectly, so far as relates to the squareness of the end facing, but also to simultaneously grind the pegs of a series of handles to a uniform length.

In my invention I employ two clamp-plates connected by screw-pins, which permit of one plate being forced toward the other by nuts on the screws, in one of which plates are series of shank-receiving holes, through which the knob-pegs are inserted, the handles being between the plates and the ends of the pins protruding from the holes at the outer side of the plate, the thickness of the plate corresponding to the length to which the pegs are to be ground, and the outer face of the plate being the gauge or surface down to which the protruding ends are ground. The knobs being inserted between the plates, with their pegs or shanks through the plate-holes, the other plate is connected to the first, and is forced toward the knobs by the screws and nuts, and opposite to each peg-receiving hole in the peg-plate, by a thumb-screw passing through the outer plate, a flexible or elastic cushion or washer being interposed between the knobs and the thumb-screws. It is in this construction and method of grinding off glass-knob pegs that my invention consists.

The drawing represents a side and sectional view of the plates and a view of the outer side of the clamp-plate.

$a$ denotes the gauge-plate, made of iron, and, as before remarked, of a thickness just equal to the length the pegs are to have. This plate is made with holes $b$, for receiving the pegs $c$ of the glass knobs $d$, the ends of the pegs extending beyond the plate, as shown at $e$. $f$ denotes the other or clamp plate, having holes through which the screw-threaded shanks of screws $g$ pass, the opposite ends of said shanks being fixed in the plate $a$, and the outer ends having upon them nuts $h$, by which the plate $f$ is forced toward the plate $a$. The plate $a$ is made with six or any other suitable number of peg-receiving holes, and in the plate $f$ are corresponding nut-threaded holes, through which pass thumb-screws $i$, each opposite to a hole, $b$, each screw $i$ holding a knob, $d$, in place, with its end $e$ protruding through the plate $a$. To prevent direct contact of the ends of the screws with the surfaces of the knobs a washer or elastic cushion, $k$, is interposed between the knobs and the plate $f$, the screws bearing directly against the washer.

The knobs being put in place, the plate $f$ is brought down to, or nearly to, them, the washer $k$ being interposed between the knobs and the plate $f$. Then each thumb-screw is turned up until the knob is securely fastened. The pegs are then ready to be ground, for which purpose the ends $e$ are laid against the opposite surface of a rotary horizontal wheel, the horizontal grinding-surface of which soon grinds off the protruding pegs and brings the end of each to a surface flush with the outer surface of the plate $a$, the pegs being then all of uniform length, and all having faces square to their axes.

Other means of fastening the knobs in place may be employed; but I prefer an arrangement of devices substantially as shown.

Although I have particularly described my invention in its application to the grinding off of the pins, pegs, or shanks of glass knobs, it will be obvious, that it is alike applicable to the grinding off of the glass shanks of other articles in which the shanks project as do the shanks of knobs.

I claim—

1. The gauge-plate $a$, having the peg-holes $b$ and provision for securing the knobs to the plate $a$, so that the pegs may be ground off down to and flush with the surface of the plate *a*.

2. In combination with the gauge-plate *a*, the plate *f* and clamp screws and nuts *g h*, substantially as shown and described.

3. In combination with the plate *a* and the plate *f* connected to it, the thumb-screws *i*, substantially as shown and described.

4. The washer *k*, in combination with the plates *a f* and thumb-screws *i*.

5. The method of uniformly and simultaneously grinding and squaring off the ends of glass-knob pegs, substantially as described.

JOHN W. HAINES.

Witnesses:
FRANCIS GOULD,
M. W. FROTHINGHAM.